Aug. 2, 1966   MASUICHI MAKIHARA   3,264,535
SILVERED MICA-CAPACITOR AND METHOD OF MAKING THE SAME
Filed June 11, 1963   3 Sheets-Sheet 1

INVENTOR
MASUICHI MAKIHARA

Variation of Q value according to decreased thickness of silver coating when silver surface is dry-stacked by foil at different pressures
(CM-15 30mmF)

Variation of Q value according to decreased thickness of silver coating when silver surface is dry-stacked by foil at different pressures
(CM-20 130mmF)

*INVENTOR*
MASUICHI MAKIHARA

Aug. 2, 1966  MASUICHI MAKIHARA  3,264,535
SILVERED MICA-CAPACITOR AND METHOD OF MAKING THE SAME
Filed June 11, 1963  3 Sheets-Sheet 3

*INVENTOR*
MASUICHI MAKIHARA
BY Wenderoth, Lind
and Ponack, Attorneys

United States Patent Office 3,264,535
Patented August 2, 1966

3,264,535
SILVERED MICA CAPACITOR AND METHOD OF
MAKING THE SAME
Masuichi Makihara, 44 Minamisenzoku-machi,
Ohta-ku, Tokyo, Japan
Filed June 11, 1963, Ser. No. 287,071
Claims priority, application Japan, Apr. 17, 1963,
38/28,206; Apr. 23, 1963, 38/20,793
6 Claims. (Cl. 317—258)

This invention generally relates to an improved mica capacitor and particularly to a novel, silver-coated mica capacitor, wherein such metal foil as lead is applied, and its improved method of manufacture.

It is the primary object of this invention to realize a drastic improvement of Q value of a silvered mica capacitor, in comparison with the conventional similar capacitor by an application of such metallic foil as lead which, for this purpose, is to be overlaid under pressure over the silver-coated mica base without any adhesive material.

Another object of this invention is to provide an improved silvered mica capacitor which is characterized by unusually large Q value and reduced size and moderate cost, realized by application of such metallic foil as lead over the silver-coated mica in an ordinary silvered mica capacitor without any adhesive material and properly adjusted area and pressure of overlay.

Still another object is the provision of a novel manner of manufacturing an improved silvered mica capacitor, which permits mass production of the said capacitor, by application of overlaying such metallic foil as lead under pressure over the silver-coated mica without any adhesive material, thereby resulting in exceptional simplicity and ease in attaching the lead terminal which in turn facilitates mass production.

A still further object of this invention resides in providing a new practice of industrial manufacture of a silvered mica capacitor, small in size and moderate in cost, by applying such metallic foil as lead overlaid under pressure on the silver-coated mica area of a silvered mica capacitor, thereby greatly facilitating soldering of a metallic lead wire to the silver-coated mica or lead foil.

Another object of the present invention is to provide an improved manner of industrial manufacture of a silvered mica capacitor, for which perfection and ease of dipping and molding can be assured by applying an overlay of the lead foil, placed under pressure without any adhesive material over the silver-coating of conventional silvered mica capacitor to accept the lead terminal, which in turn is protected by glass fiber cloth.

These and other objects and novel features of the present invention will be readily apparent from a description of the accompanying drawings, in which.

Figure 1:
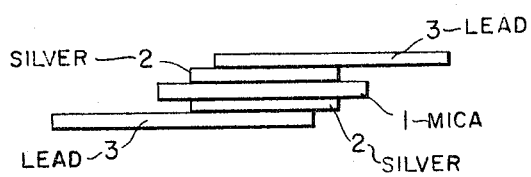
FIG. 1 is an illustration, showing a side view of a stack of silver-coated mica and lead foil, the former being sandwiched by the latter, without application of compacting compressing pressure.

A silvered mica capacitor, wherein silver is baked on both sides of the mica sheet and metallic wire leads are soldered thereto, is already known.

The present invention is related to a manufacturing practice of an improved silvered mica capacitor, reduced in size and moderate in cost, in comparison with the conventional capacitor, by use of the lead foil over the silver-coated mica without any adhesive material, thereby realizing drastic improvement of Q value of the capacitor, and as well by use of the said lead foil also as a base for connecting of the lead terminal, thereby assuring extreme simplicity and ease of the terminal construction, and facilitating soldering of the metallic lead wire to the said lead foil.

An embodiment of this invention is represented by application of such metallic foil as the lead under pressure, over the silver-coated mica sheet without any adhesive material of a silvered mica capacitor as has been previously described. Compacted overlay of the lead foil, sandwiching the silver-coated mica sheet, causes a noticeable change of Q value of the capacitor in accordance with the area and pressure of the overlay. Compacting pressure, applied to the lead foil and silver-coating combination causes a reduction of thickness of the silver-coating from ⅓ to ⅔ of the same when not compacted and/or control of the area of overlay by the lead foil, to ½ of the silver-coating, which gives rise to extremely large change of Q. This invention has another object of using the overlaying lead foil also as a base for lead terminal.

A detailed description of the embodiments of this invention, in conjunction with the accompanying drawings, will be made, starting at the overlay of the metallic foil such as lead on the silver-coated mica, which is the first embodiment of the present invention.

Heretofore, the practice of fixing the silver particles to the mica sheet has been vaporization of silver in a vacuum, blasting of sprayed silver paint and silver printing, etc.

It should be noted, however, that the silver coating of the mica sheet, by any of the above specified practices, resorts to the molecular force of a silver particle or adhesive which, for this purpose, builds up a group of silver particles, arranged in a plane.

Individual silver particles in the said group are properly overlayed each other, and are mixed with such electrically non-conductive adhesive as lead borate, or glass powder of a low characteristic melting point, so that the electric resistance of the silver coating on the surface of mica sheet, so set up, is not always acceptable, in comparison with a metallic film of the same thickness. But it is true that the silver particle is firmly stuck to the base, or mica sheet, and provides an electrode which assures an excellent characteristic silver coating, except that the electric conductivity is rather low.

Reduction of the electric resistance of the silver coating can be readily accomplished by increase of the thickness, which, however, means an added cost.

Figure 2:
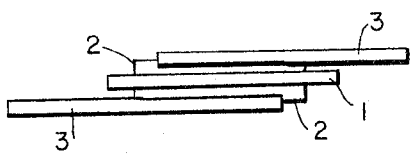
FIG. 2 is a side view of the same combination as preceding FIG. 1, which is composed of the lead foil and the silver-coated mica sheet, compacted together by application of pressure.

Meanwhile, it has been found that a reduction of electric resistance, accompanied by improved Q value, can be realized by application of the lead foil, less costly than the silver, over the mica coating under pressure, as illustrated in FIG. 2, because it can properly fuse with the silver particles, owing to its characteristic high softness, thus setting up two conductors in parallel together with the silver coating.

Figure 6:
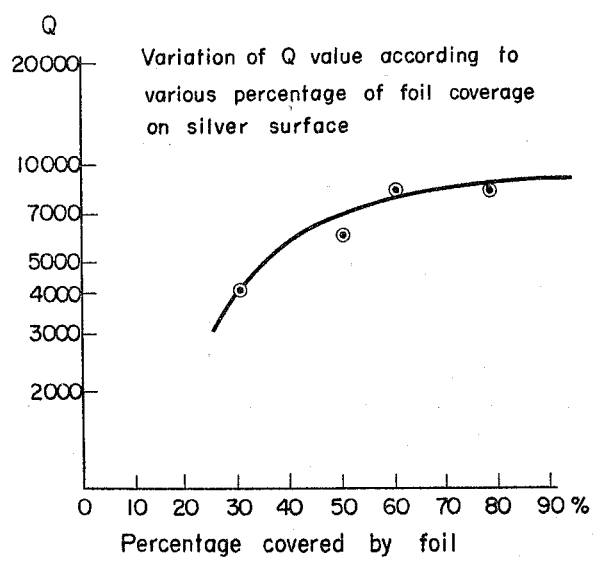
FIG. 6 is a plotted representation of several Q values depending on the area of pressed overlay of the lead foil over the silver-coated mica.

Improvement of Q value is dependent on the ratio of coverage by the lead foil on the silver coating of a silvered mica capacitor, as may be readily understood from the plotting, shown in FIG. 6, from which, however, it is also noted that coverage ratio in excess of 50% results in no noticeable change of Q value.

When the lead foil has been applied for overlay as illustrated in FIG. 2 (under pressure of compacting), not as in FIG. 1 (without pressure), it is reasonably considered that the total electric resistance of the silver coating and the lead foil varies, according to a degree of fusion of the lead foil with the silver coating, because contact resistance between them is changed accordingly.

To make a descriptive explanation, 5.55 mm. (L) x 2.76 mm. (W) silver coating 2 is made by baking to a 8.73 mm. (L) x 4.76 mm. (W) mica sheet 1 (specified dimensions are only examples) to get a silvered mica capacitor as illustrated in FIG. 3, FIG. 4 and FIG. 5 (electrostatic capacity 30 pf.).

Figure 3:
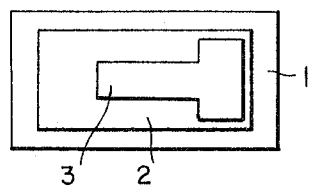
FIG. 3 illustrates a method of overlaying T-shaped lead foil on one sheet of silver-coated mica.
Figure 4:
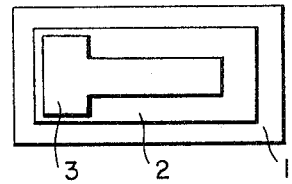
FIG. 4 shows the back side of FIG. 3, a side view of which is illustrated by FIG. 5.
Figure 5:
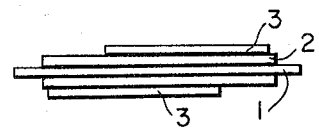

$10\mu$ thick silver coating 2 (on each side of mica sheet) is covered by overlaying $13\mu$ thick lead foil and shaped as shown in FIG. 3 and FIG. 4, as illustrated in FIG. 1. A combination so set up was then sandwiched by 0.1 mm. thick brass plates, with which the said combination is compacted, applying suitable pressure and heat. Various temperatures from 170° C. to 220° C. and pressures from 10 kg./cm.² to 150 kg./cm.² maintained for a period of about 60 seconds, were applied to get various plottings depending on the fusion of the lead foil with the silver coating, expressed in the term of micron as the abscissa and value of Q as the ordinate, resulting in the curve, shown in FIG. 7. Then, when another silvered mica capacitor, represented by FIG. 3, FIG. 4 and FIG. 5, but wherein the $6\mu$ thick silver coating 2 (5.34 mm. (L) x 12.6 mm. (W)) applied to the mica sheet 1 (7.94 mm. (L) x 15.6 mm. (W)) (electrostatic capacity 130 pf.), was prepared by applying the $13\mu$ thick lead foil, shaped as shown in FIG. 3 and FIG. 4, to overlay the silver coating under pressure, the diagrammatic representation, shown in FIG. 8 is obtained, wherein various plottings have been made depending on fusions of the lead foil 3 into the silver coating, expressed in the term of micron as the abscissa and corresponding Q value as the ordinate.

Figure 7:
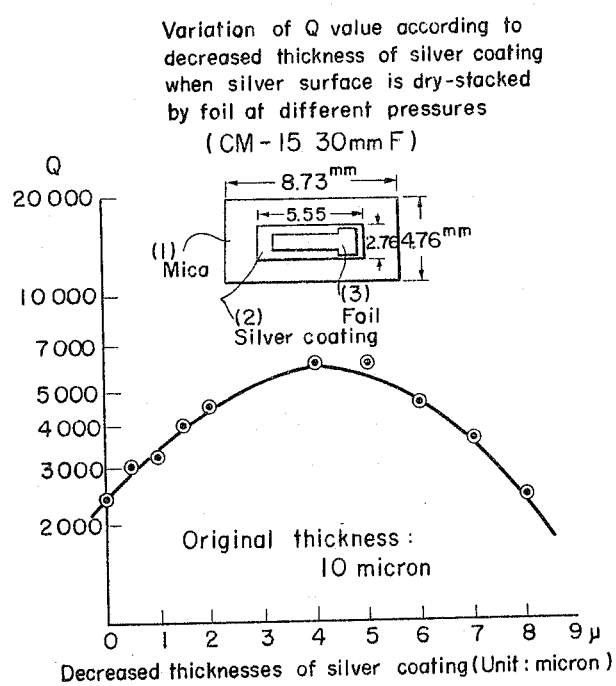
FIG. 7 illustrates a plotted diagram of several Q values of a 30 piccofarad silvered mica capacitor, caused by changing the compacting pressure, as represented by a decrease in thickness in the silver-coating.
Figure 8:
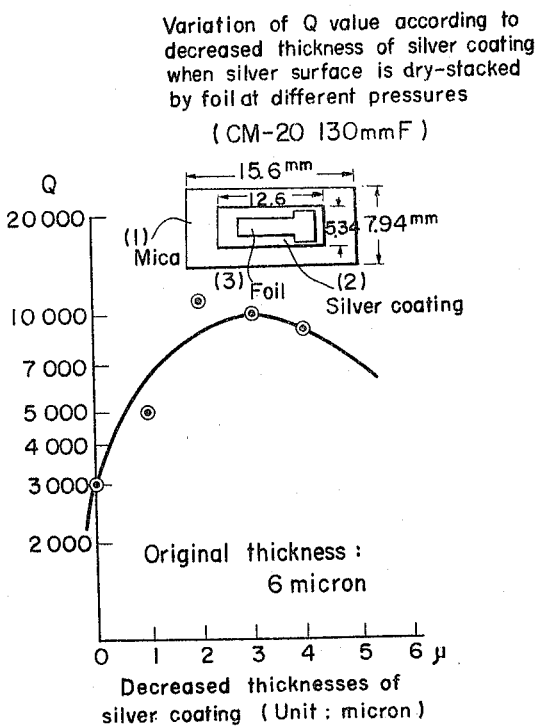
FIG. 8 is a similar plotted diagram of Q values to FIG. 7, related to a 130 p.f. silvered mica capacitor.

From both plottings in FIG. 7 and FIG. 8, it is apparent that compacting of the lead foil 3 until thickness of the silver coating 2 is reduced down to ⅓–⅔ of the original magnitude permits reaching the max. Q of the silvered mica capacitor. A silvered mica capacitor with a capacity of 30 pf., as shown in FIG. 7 and another capacitor with a capacity of 130 pf., represented by FIG. 8 have, in a conventional type of capacitor construction, characteristic Q value of 1000 and 3000 respectively. Reduction in thickness of the silver coating by only ⅔–⅓, by application of pressure, according to an embodiment of the present invention enables drastic increase of the value of Q of the capacitor up to more than three times that of a conventional silvered mica capacitor.

Another advantage of this invention is that the silver coating and the lead foil, compacted together, pursuant to this invention, is mechanically pressed so tightly that they can not be separated even though the lead foil has been broken or the mica sheet has been delaminated. Such lasting and unusually high strength of the combination of the lead foil and the silver coating permits the use of the said lead foil as a base for the lead terminal, which is the most recommendable from a technical standpoint. Namely, the present invention permits the soldering of the lead wire, either directly or indirectly, to the silver, baked to the surface of the mica sheet, through the lead foil, in place of the conventional construction which is always accompanied by many difficulties, thus assuring economy and avoiding damage to the mica sheet, as no clamping is necessary and thereby providing an improved performance of the mica capacitor in comparison with conventional capacitors, further resulting in a greatly reduced size and cost in comparison with the conventional capacitor with equal ratings.

Difficulties in conjunction with one of the conventional constructions of the mica capacitors may be a painstaking soldering of the metallic lead wire directly to the silvered surface on both sides of the mica sheet, coated with an electronically-conductive paint, containing the silver particles and applied by a printing practice, the silver coating being baked to the surface of the mica sheet and designed for use as an electronic conductor which is a very thin film, set up by continuously arranged particles of silver and with a thickness of only $1$–$10\mu$.

The soldering of 0.6 mm. or 1.0 mm. copper or brass wire as a metallic lead wire to such thin film as specified above often encountered various difficulties.

For soldering the lead wire, it is the usual practice to resort to a solder which contains about 5% of silver particle, which is disadvantageous in that heat of the soldering iron melts the silver particles which accordingly tend to cohere to the point to be soldered, thus causing difficulty in realizing successful soldering.

In order to assure ease of soldering, coarsening of silver particles is one of the recommended practices, but it naturally results not only in an increased thickness of silver coating and liability to exfoliation, but also increased requirement of the silver. For the present invention, the following two novel methods are to be embodied, based on use of the lead foil. The first of them is that the lead foil with a hole or holes is used to facilitate the soldering of the lead wire to the silver-coating, which connects the lead wire to the lead foil and silver coating through the hole or holes in the lead foil. This practice of soldering permits no local concentration of heat from the soldering iron, but dissipation of the same through the lead foil, thus assuring comparative ease of soldering. The second method is soldering the lead wire directly to the lead foil fused with the silver-coating.

This practice of soldering is performed, not with aforesaid silver solder, but with ordinary and low-cost Pb–Sn solder.

For success of soldering by either of two methods stated above, size of the lead foil shows up better at 50% to 80% of the surface area of the silver coating, as previously mentioned, which assures the highest possible Q value.

Figure 9:
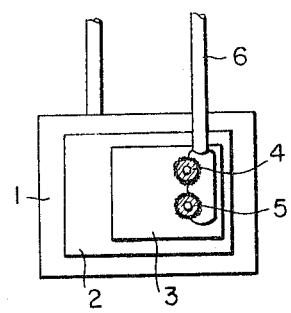
FIG. 9 shows a sheet of silver-coated mica, sandwiched by the lead foils under pressure, to which metallic lead wires have been soldered.

Embodiments of the present invention will be apparent from the descriptions of the accompanying drawings, in which:

FIG. 9 is an illustration of soldering of the lead wire to one sheet of silver coated mica; 1 is mica sheet; 2 is silver coating, baked to the mica sheet; 3 is the lead foil, overlaying the silver coating; 4 shows the position of holes for soldering the three elements together, that is, the lead wire, lead foil and the silver coating; 5 shows aforesaid silver solder and 6 is the metallic lead wire.

In FIG. 9, the lead foil 3 overlays more than about 50% of the surface of the silver coating, and the hole 4 can be placed in more than two positions for connecting the metallic lead wire.

Soldering can be carried out through this hole 4 to solder together the three elements; the lead wire 6, the lead foil 3 and the silver coating on the mica sheet 2. For this soldering, embodiment of this invention requires no special increase in the thickness of the silver coating, baked to the surface of the mica sheet as well as no baking of coarse silver particle to the said surface and permits use of low-cost silver paint for satisfactory performance of the capacitor, as well as soldering, at extreme ease, of the metallic lead wire 6 to the silver coating 2 through the lead foil 3.

FIG. 3, FIG. 4 and FIG. 5 illustrates the layout of T-shaped lead foil, overlaid on one sheet of mica.

FIG. 4 corresponds to the back side of FIG. 3, and FIG. 5 shows the side view of the same. In these illustrations, 1, 2 and 3 are same as in description of FIG. 9, namely, 1 is mica sheet, 2 is silver particle coating, baked to the mica sheet and 3 is the lead foil, fused to the silver coating.

FIG. 10 through FIG. 17 illustrates several examples of embodiment of the present invention.

Figure 10:
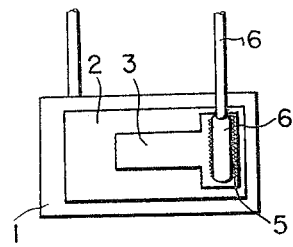
FIGS. 10 through FIG. 17 show several examples of embodiment of this invention for manufacturing the actual silvered mica capacitor in pursuant to this invention.

FIG. 10 shows, the lead wire, jointed with an ordinary Pb–Sn solder to the lead foil, which, as in FIG. 9, covers more than 50% of the silver coating, and kept heated at 170° C.–220° C., applying a pressure of 100 kg./cm.$^2$, for a continuous period of about 60 seconds.

Figure 11:
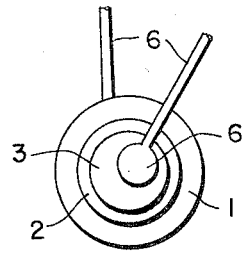

FIG. 11 is an example of the embodiments of this invention wherein disk mica is employed and the lead wire end flattened and joined to a thin disk lead foil.

Both FIG. 10 and FIG. 11, stated above, relate to attaching the metallic lead wire by soldering to the lead foil 3 with or without holes, pressed to a silver coated mica 1.

Figure 12:
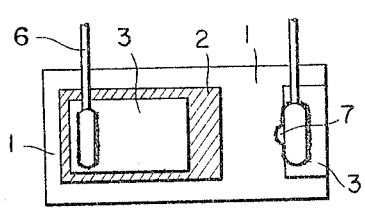
Figure 13:
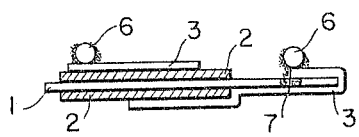

FIG. 12 and FIG. 13 illustrate the soldering of the lead wire to the lead foil 3 through the hole 7 provided on one end of the mica 1, in order to have the said wire 6 positioned on the same side of the mica 1.

FIG. 13 shows the end section of FIG. 12.

Construction of a silvered mica capacitor, as illustrated in FIG. 12 and FIG. 13, is highly convenient for encapsulation because the lead wire 6 is soldered to the silver-coated mica on the same side, and is more recommendable when the number of stacked mica sheets are larger than the example as illustrated.

As shown in FIG. 12 and FIG. 13, soldering of the lead wire 6 to the lead foils, sandwiching a sheet of silver-coated mica 1 through the hole 7, provided in the said mica 1 has another advantage. In that construction the joint of the lead wire is effectively strengthened, and at the same time preventing fall off of the silver coating from the mica sheet.

Figure 14:
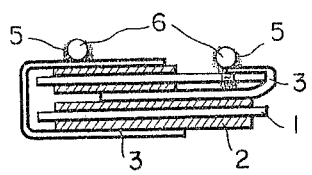
Figure 15:
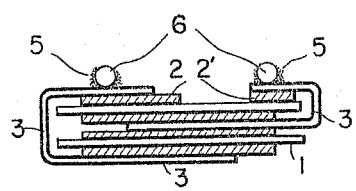

Both FIG. 14 and FIG. 15 represent examples of side views of a stack of two sheets of mica, in which the lead foil 3, according to this invention, is used with the silver coating, baked to the mica base; FIG. 14 relates to the mica sheet 1 with a hole or holes, and FIG. 15 illustrates the construction wherein one side of the mica sheet 1 has two separate silver coatings 2 and 2', both of which serve to joint the turned-back end of the lead foil 3 as well as the lead wire 6.

Figure 16:
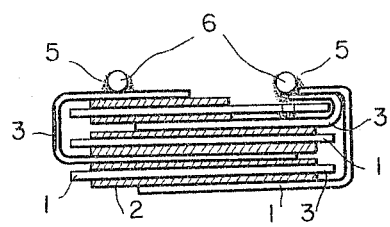
Figure 17:
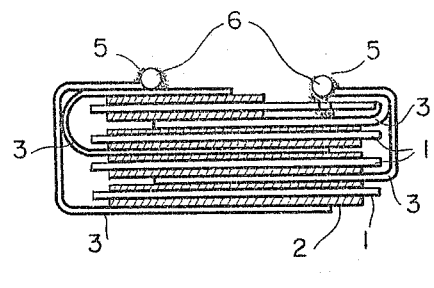

FIG. 16 and FIG. 17 shows three and four mica sheet 1 constructions of a capacitor, according to the present capacitor. In both figures, the lead foil is fused with the silver coating according to this invention, and individual silver-coated mica sheets 1 are tied up together by the lead foil 3, ends of which are turned back, into one rigid sandwich, thus eliminating possibility of break-up of the silver-coated mica sheets 1.

Because the lead foil 3, ends of which are turned back, and, is of solid construction, represented by only one metallic constructor, and not a simple stack up of several metallic foils, unstable electric resistance can be present nowhere between the silver coating 2 to the lead wire 6, resulting in assured high conductivity of the soldered joint.

The above description can be supplemented in that the present invention can provide an improved capacitor, for which intermittent contact can never take place as is often experienced in a conevntional stacked mica capacitor.

Embodiment of this invention also assures minimizing of the diffiulties of a mica capacitor, because the connection of the electrode and the lead wire is of the least distance.

The valuable advantage, as described above, permits a rise of resonance frequency of the capacitor, owing to a reduced inductance, which in turn provide another possibility of service of the capacitor at a very high service frequency.

As to FIG. 14, FIG. 15, FIG. 16 and FIG. 17, use of the turned back ends of the lead foil 3, pressed to the silver coating 2, as a base for lead terminal, means a firm tie up of several silver-coated mica sheets into a rigid combination, which in turn permits use of several sections, cut from a long width of the said combination, in other words, provides a possibility of mass-production of a small silvered mica capacitor in a very easy and simple practice.

Tie up of several mica sheets into a rigid combination, by means of the lead foil, as already referred to, is extremely acceptable for reduction of capacitor size, and dipping as well as molding as will be described later.

The lead foil may be substituted by such other terminal metals as lead-, tin- or silver-plated copper, only at the outermost layer. In the present invention, however, the mica element often tends to deform or crack because of extremely small thickness, when encapsulated with the plastic resin by molding or dipping.

According to the present invention, the silvered mica capacitor is so set up, for elimination of the above mentioned difficulties, in such a manner that the lead foil, fused with the silver coating, is turned back on its end, as illustrated in FIG. 12 through FIG. 17, to tie up all member mica sheets into a rigid combination of sections, which in turn is wrapped by the adhesive tape, cut into a suitable size from a glass fiber cloth, coated with an adhesive, thus assuring a good protection of the section and ease of dipping and molding. It is quite natural that the adhesive to coat the said tape should be of, for example, epoxy-resin type. In order to eliminate an unfavorable effect to insulation and power factor of the capacitor the glass fiber cloth is as thin as 0.1 mm., which provides a good flexibility, unobjectionable for use to manufacture the capacitor. Resin, clinging to the glass fiber cloth becomes rigid after dipping and molding, providing satisfactory mechanical strength and causing no difficulty for assuring precision of dimension in making a very small capacitor.

Further advantages of the silver-coated mica capacitor are that, unlike a conventional ceramic capacitor, it is characterized by a small size for a large temperature coefficient, that a comparatively uniform thickness of the mica sheet can be realized because the said sheet is of natural mica, and finally that minimum waste occurs.

In comparison with a conventional mica capacitor, the silver-coated mica capacitor, pursant to this invention, is advantageous in that cost can be reduced, corresponding to eliminated terminal lug to clamp the mica sheet, and there can be no possibility of damage on the end or edge of the mica, and hardly any chance of causing mechanical deformation or strain of the mica sheet, as is often the case with a conventional capacitor. The lead foil, to be fused with the silver-coating, baked to the surface of the mica sheet, an embodiment of the present invention, may be replaced with another metal, for example, tin, zinc, aluminum or silver, etc., which is believed to be substantially satisfactory.

Although I have described my invention with a certain degree of particularly, it is understood that the present disclosure has been made only by way of example and that numerous changes in the details of construction and the combination and arrangement of parts may be resorted to without departing from the spirit and the scope of the invention as hereinafter claimed.

What I claim is:

1. A silvered mica capacitor, comprising a mica sheet, a silver coating on the opposite faces of said sheet, a lead foil on each face of said sheet and covering more than 50% of each face of said sheet and being fused into the silver coating, the thickness of the silver coating beneath said foil being compressed to a thickness of from ⅓ to ⅔ of its thickness prior to the fusing of the foil thereto, and a lead wire attached to the foil on each face of the sheet.

2. A silvered mica capacitor as claimed in claim 1 in which the foil on each face of the sheet has a hole therein adjacent one end of the sheet, and said leads being soldered to said foil at the positions of said holes.

3. A silvered mica capacitor as claimed in claim 1 in which the lead foil on one face of said sheet extends around the end of the sheet and is engaged directly against the opposite face of the mica sheet and at a point spaced from the silver coating on said opposite face of the mica sheet, the lead wire attached to said lead foil on said one face of said sheet being attached at the portion which lies against the said opposite face of the mica sheet.

4. A silvered mica capacitor, comprising a plurality of mica sheets, a silver coating on the opposite faces of each of said sheets, said sheets being stacked with the faces opposed to each other, a lead foil on the top surface of the top sheet and on the bottom surface of the bottom sheet in the stack, and a lead foil between each pair of adjacent sheets in the stack, each lead foil covering more than 50% of the face of the sheet on which it is positioned and being fused into the silver coating, the thickness of the silver coating between each foil and each sheet being compressed to a thickness of from ⅓ to ⅔ of this thickness prior to the fusing of the foil thereto, and lead wires attached to appropriate foils in said stack of sheets.

5. A method of making a silvered mica capacitor, comprising the steps of coating the opposite faces of a sheet of mica with a silver coating, applying a lead foil directly to more than 50% of the area of each of the opposite silver coated faces without any adhesive between the foil and the silver coating, fusing the lead foil to the silver coating by applying pressure to the lead foil of from 10 to 150 kg./cm.² and at a temperature of from 170 to 220° C. for compressing the silver coating which is covered with the lead foil to a thickness of from ⅓ to ⅔ of its thickness prior to the fusing of the foil thereto, and attaching a lead wire to the foil on each face of the sheet.

6. A method of making a silvered mica capacitor, comprising the steps of coating the opposite faces of a sheet of mica with a silver coating, applying a lead foil directly to more than 50% of the area of each of the opposite silver coated faces without any adhesive between the foil and the silver coating, fusing the lead foil to the silver coating by applying pressure to the lead foil at an elevated temperature and compressing the silver coating to a thickness of from ⅓ to ⅔ of its thickness prior to the fusing of the foil thereto, and attaching a lead wire to the foil on each face of the sheet.

References Cited by the Examiner
UNITED STATES PATENTS

| 1,334,142 | 3/1920 | Dublier | 317—261 |
| 1,829,891 | 11/1931 | Dublier | 317—261 |
| 2,502,310 | 3/1950 | Chapman | 317—261 |
| 2,585,752 | 2/1952 | Dorst | 29—25.42 |
| 2,753,616 | 7/1956 | Tognola | 29—25.42 |
| 2,915,808 | 12/1959 | Clemons | 29—25.42 |
| 3,002,137 | 9/1961 | Kahn | 317—261 |
| 3,151,382 | 10/1964 | McHugh | 317—261 X |

FOREIGN PATENTS 807,480 1/1959 Great Britain.

OTHER REFERENCES

Dummer, G. W. A. et al.: Fixed and Variable Capacitors, McGraw-Hill Co., New York, 1960, page 17.

LARAMINE E. ASKIN, *Primary Examiner.*

E. JAMES SAX, JOHN F. BURNS, *Examiners.*

E. GOLDBERG, *Asssistant Examiner.*